(12) United States Patent
Mayhew et al.

(10) Patent No.: US 7,414,377 B2
(45) Date of Patent: Aug. 19, 2008

(54) SYSTEM AND METHOD FOR AUTOMATIC CURRENT LIMIT CONTROL

(75) Inventors: Scott Mayhew, North Aurora, IL (US); Scott Wakefield, Plano, IL (US); Daniel Zuzuly, Geneva, IL (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 1058 days.

(21) Appl. No.: 10/252,637

(22) Filed: Sep. 23, 2002

(65) Prior Publication Data

US 2004/0056622 A1 Mar. 25, 2004

(51) Int. Cl.
*H02P 7/00* (2006.01)
(52) U.S. Cl. .................. 318/432; 318/433; 318/434; 318/783
(58) Field of Classification Search ......... 318/727–733, 318/778–782, 807–813, 825–828, 244–245, 318/430, 434, 439
See application file for complete search history.

(56) References Cited

U.S. PATENT DOCUMENTS

| 3,819,996 | A | * | 6/1974 | Habisohn | 318/777 |
|---|---|---|---|---|---|
| 4,902,954 | A | | 2/1990 | Oshima et al. | 318/762 |
| 5,276,392 | A | * | 1/1994 | Beckerman | 318/751 |
| 5,325,034 | A | * | 6/1994 | Reynolds et al. | 318/782 |
| 5,604,672 | A | | 2/1997 | Yoshida et al. | 363/97 |
| 5,703,456 | A | * | 12/1997 | Cox | 318/701 |
| 5,889,392 | A | * | 3/1999 | Moore et al. | 323/282 |
| 6,160,372 | A | * | 12/2000 | Cusack | 318/786 |
| 6,201,369 | B1 | * | 3/2001 | Johnson | 318/811 |
| 6,479,958 | B1 | * | 11/2002 | Thompson et al. | 318/430 |
| 6,586,905 | B1 | * | 7/2003 | Johnson | 318/778 |
| 6,605,918 | B2 | * | 8/2003 | Mayhew et al. | 318/727 |
| 6,894,452 | B2 | * | 5/2005 | Mayhew et al. | 318/569 |
| 2002/0079859 | A1 | * | 6/2002 | Lumsden | 318/727 |
| 2003/0042865 | A1 | * | 3/2003 | Mayhew et al. | 318/727 |
| 2004/0051494 | A1 | * | 3/2004 | Messersmith | 318/729 |
| 2004/0056611 | A1 | * | 3/2004 | Mayhew et al. | 318/16 |
| 2004/0056615 | A1 | * | 3/2004 | Jonsson et al. | 318/434 |
| 2004/0056619 | A1 | * | 3/2004 | Jonsson et al. | 318/440 |
| 2004/0056631 | A1 | * | 3/2004 | Derksen | 318/727 |
| 2004/0155622 | A1 | * | 8/2004 | Mayhew et al. | 318/778 |
| 2004/0207344 | A1 | * | 10/2004 | Derksen | 318/16 |

FOREIGN PATENT DOCUMENTS

GB 2168829 A 6/1986

* cited by examiner

*Primary Examiner*—Marlon T Fletcher

(57) ABSTRACT

A motor controller system comprises solid state switches for connection between an AC line and motor terminals for controlling application of AC power to the motor. A sensor senses AC line voltage. A control circuit controls operation of the solid state switches. The control circuit ramps switch current during a start mode and selectively holds switch current during the start mode if sensed voltage drops below a threshold amount.

21 Claims, 4 Drawing Sheets

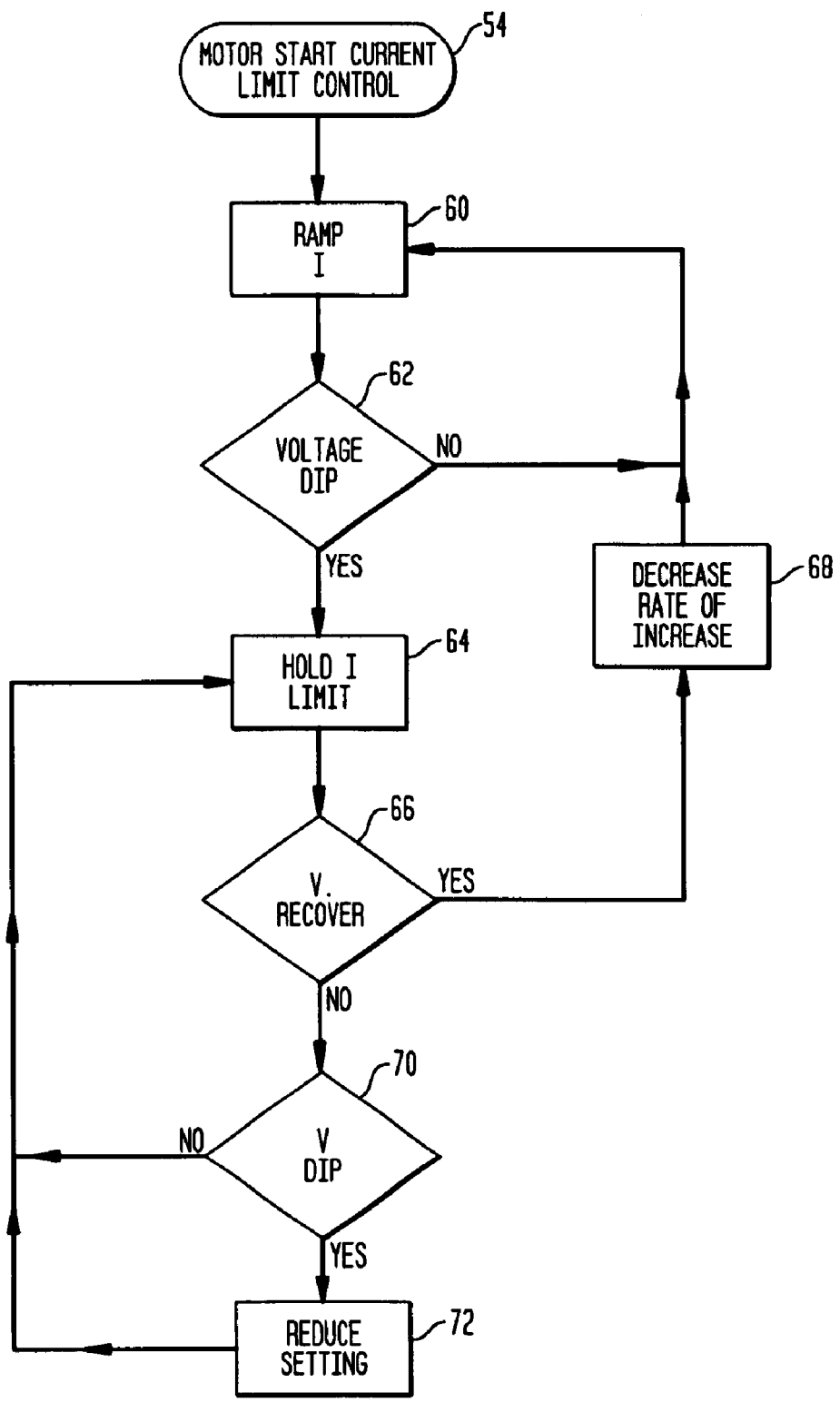

SYSTEM AND METHOD FOR AUTOMATIC CURRENT LIMIT CONTROL

CROSS REFERENCE TO RELATED PATENT APPLICATIONS

The present U.S. Patent Application having at least one common inventor as

U.S. patent application Ser. No. 10/252,618 entitled "System and Method for Monitoring Currents and for Providing Motor Protection", and U.S. patent application Ser. No. 10/252,326 entitled "System and Method for Configuring a Starter with an External Device",and U.S. patent application Ser. No. 10/252,635 entitled "System and Method for Individual Phase Motor Over Voltage Protection",and U.S. patent application Serial No. 10/252,327 entitled "System and Method for a Configurable Motor Controller", are filed with the U.S. Patent and Trademark Office concurrently on Sep. 23, 2002, the entirety of each being incorporated herein by reference.

FIELD OF THE INVENTION

This invention relates to a motor controller and more particularly, a system and method for automatic current limit control.

BACKGROUND OF THE INVENTION

Solid state starters/controllers have found widespread use for controlling application of power to an AC induction motor. The conventional starter/controller, referred to hereinafter as simply a starter or a controller, uses solid state switches for controlling application of AC line voltage to the motor. The switches may be thyristors such as silicon controlled rectifiers (SCRs) or triacs.

One application for a motor controller is as an elevator starter. The elevator starter may be used to drive a pump for an hydraulic elevator. Each time movement of an elevator car is commanded, then the starter must start the motor until it reaches operating speed and then operate in a run mode. Such a starter may only be used for the up direction as gravity may be used for the down direction.

One type of elevator starter initially connects the motor windings in a Y-configuration to start the motor and bring it up to speed. Then the windings are reconnected in a delta configuration with full voltage. Other starters change the on time of the solid state switches to ramp up motor current with a fixed connection. Known elevator starters have selector switches for setting a starting current limit setting. Depending on configuration, the setting is adjustable from about 100 percent to 450 percent of the starter's current rating. As a general rule, the higher the setting the lower the start time and conversely, the lower the setting the longer the start time. In an elevator application end users are interested in starting the motor as fast as possible while eliminating power quality issues such as voltage dips and sags and contact or switching transients. Known designs utilize current transformers to read motor current. The current is rectified and filtered before being read by an analog to digital converter in a digital signal processor (DSP). Due to filtering there is a delay between the current on the line and the actual signal the DSP receives.

On some elevator control systems with variable loading the load may be brought up to speed on a particular setting without any voltage dip when the power system is lightly loaded. The same setting may cause the line voltage to dip when the power system is loaded at or near its capacity such as during summer months when power demand is extremely high and brownout conditions are common. In such situations the starting current limit is usually set to the lower setting discussed above. While this ensures that the starter will start the load with minimal voltage fluctuations, additional time is spent starting at the lower current. As can be appreciated, if the starter is not initially set up correctly, then repeated trips back to an installation may be required for further adjustment to eliminate voltage dips.

Starter applications using back up generators can have similar problems. When operating off the line power, the incoming voltages can be reliable and allow for starting currents in excess of 300% of the starters rating. However, when a back up generator is powering the system, then voltage dips can be seen with current limit settings above 200%. In order to allow a system to operate without a excessive voltage dips, the setting for the generator would have to be used even though it would add additional unnecessary time to each start when the system is powered off of line power.

The present invention is directed to solving one or more of the problems discussed above, in a novel and simple manner.

SUMMARY OF THE INVENTION

In accordance with the invention there is provided a system and method for automatic current limit control in a motor controller.

Broadly, in accordance with one aspect of the invention there is disclosed a motor controller system comprising solid state switches for connection between an AC line and motor terminals for controlling application of AC power to the motor. A sensor senses AC line voltage. A control circuit controls operation of the solid state switches. The control circuit ramps switch current during a start mode and selectively holds switch current during the start mode if sensed voltage drops below a threshold amount.

It is a feature of the invention that the control circuit decreases switch current during the start mode if sensed voltage drops below a reduced threshold.

It is another feature of the invention that the control circuit resumes the switch current ramp during the start mode if sensed voltage recovers above the threshold amount. The current control circuit resumes the switch current ramp at a decreased rate of increase.

It is still another feature of the invention to provide current sensors for sensing switch current.

It is a further feature of the invention that the solid state switches comprise SCRs and firing angle is adjusted to control switch current.

There is disclosed in accordance with another aspect of the invention a motor starter system comprising solid state switches for connection between an AC line and motor terminals for controlling application of AC power to the motor. A voltage sensor senses AC line voltage. Current sensors sense switch current. A control circuit is operatively connected to the voltage sensor and the current sensors for controlling operation of the solid state switches during a start mode. The control circuit ramp switch current in a preselect range during the start mode and selectively holds switch current during the start mode if sensed voltage drops below a threshold amount.

There is disclosed in accordance with a further aspect of the invention the method of limiting current during motor starting comprising: providing solid state switches for connection between an AC line and motor terminals for controlling application of AC power to the motor; sensing AC line voltage; sensing switch current; ramping current through the solid state switches during motor starting; and selectively holding switch current constant during motor starting if sensed voltage drops below a threshold.

Further features and advantages of the invention will be readily apparent from the specification and from the drawings.

BRIEF DESCRIPTION OF THE DRAWINGS

FIG. 5 is a flow diagram illustrating a motor start current limit control module implemented by a processor of FIG. 2.

DETAILED DESCRIPTION OF THE INVENTION

Figure 1:
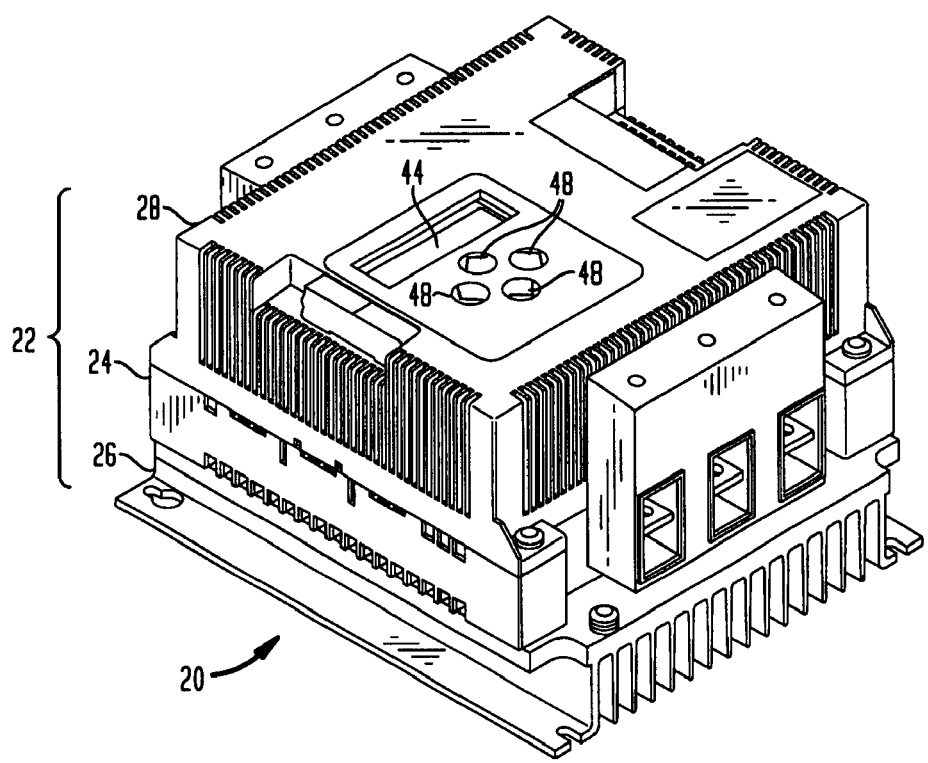
FIG. 1 is a perspective view of a motor controller in accordance with the invention.

Referring initially to FIG. 1, a solid state motor starter/controller 20, referred to hereinafter as simply a starter or a controller, is illustrated. One application for the controller 20 is as an elevator starter. The motor controller 20 may be used to drive a pump for an hydraulic elevator. Each time movement of an elevator car is commanded, then the motor controller 20 must start the elevator motor until it reaches operating speed and then operate in a run mode. Such a motor controller 20 may only be used for the up direction as gravity may be used for the down direction.

The motor controller 20 comprises a housing 22 including a housing base 24, a heat sink 26 and a cover 28. The motor controller 20 includes a plurality of solid state switches 32 in the form of thyristors, such as back to back connected silicon controlled rectifier (SCR) pairs, see FIG. 2. For simplicity herein, the SCR pairs are referred to as simply SCRs. Triacs could also be used. The SCRs 32 control application of three phase AC line voltage to a three phase motor. As is apparent, a different number of SCRs 32 could be used to control different numbers of phases, as is apparent to those skilled in the art.

Figure 2:
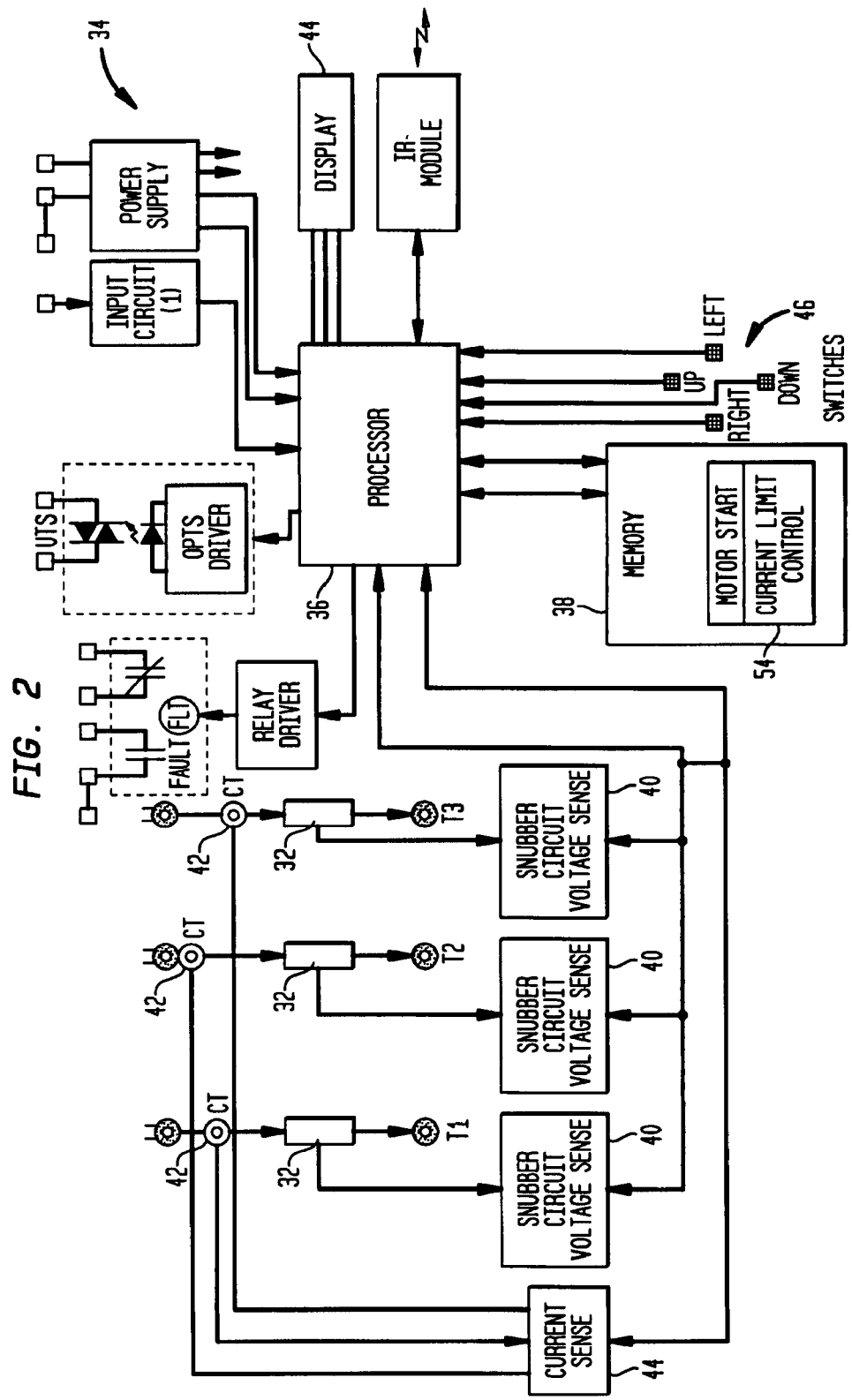
FIG. 2 is a block diagram of the motor controller of FIG. 1.

The SCRs 32 are mounted to the heat sink 26 within the housing 20. Referring also to FIG. 2, a control circuit 34 is also enclosed in the housing 20. The control circuit 34 controls operation of the SCRs 32. Particularly, the control circuit 34 includes a programmed processor 36, such as a digital signal processor, for commanding operation of the SCRs 32. A memory 38 is connected to the processor 36 and stores programs and configuration information relating to operation of the SCRs 32, as described below.

The processor 36 is connected to three interface circuits 40 each for connection to one of the SCRs 32. Particularly, the interface circuits 40 comprise snubber circuits for driving the SCRs 32 and voltage sense circuits for sensing line voltage and motor terminal voltage, representing voltage across the SCRs 32. A current transformer 42 senses current of each of the SCRs 32 and is connected to a current sense circuit 44. Other types of current sensors could be used. The current sense circuit 44 is also connected to the processor 36.

An LCD display 44 on the cover 22, see FIG. 1, is connected to the processor 36. The display 44 is used to indicate configuration settings, operating values, fault conditions, and the like. User actuable switches 46 are electrically connected to the processor 36. The user actuable switches 46 are actuated by actuator elements 48 on the housing cover 22, see FIG. 1. Particularly, the switches 46 are used for locally selecting parameters for stored configuration information.

Figure 3:
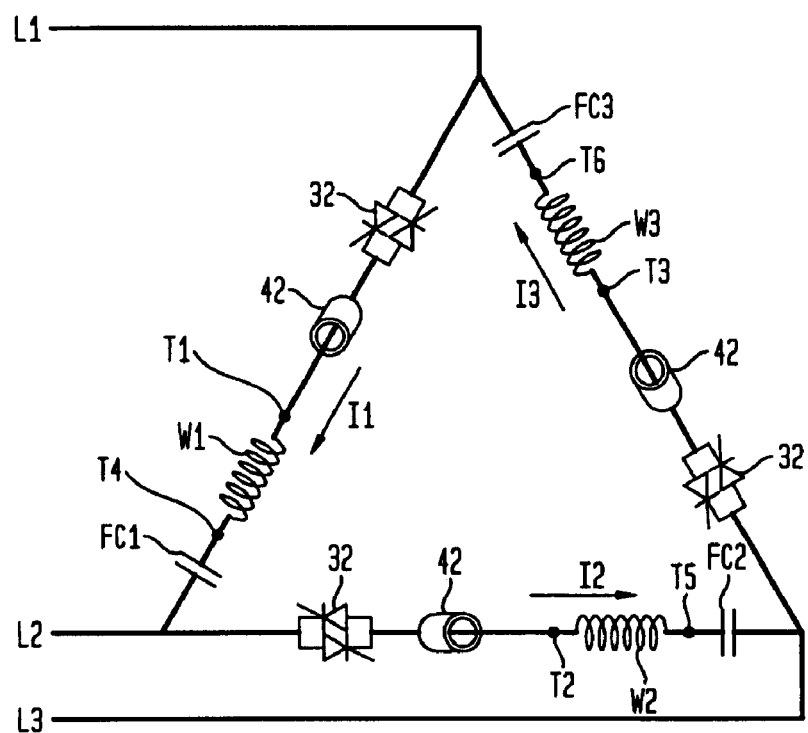
FIG. 3 is a wiring diagram of the motor controller of FIG. 1 connected to a motor in a delta configuration.

Referring to FIG. 3, an electrical schematic illustrates connection of the SCRs 32 of FIG. 2 to motor windings in a typical delta configuration. For example, one of the SCRs 32 is connected between the first phase line voltage L1 and the first motor terminal T1. The first motor winding W1 is connected in series with the SCR 32 between the motor terminal T1 and another motor terminal T4. The current transformers 42 sense current through the winding W1. A fault contact FC1 is also connected in series. The other legs of the delta configuration are generally similar and are conventional in nature. As is apparent, other motor configurations could be used in connection with the disclosed system and method.

Figure 4:
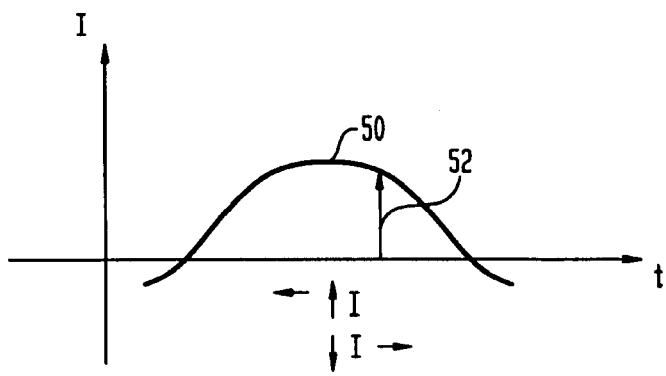
FIG. 4 is a curve illustrating current control for the SCRs of the motor controller.

The processor 36 of FIG. 2 operates in accordance with a control program for controlling operation of the SCRs 32. Particularly, each SCR 32 is conventionally controlled to satisfy voltage and current requirements. This is done by altering the firing angle of the SCRs 32. FIG. 4 shows a graphical illustration including a line curve 50 representing input current. A vertical arrow 52 represents firing angle of the SCRs 32. As is conventional, the firing angle 52 is controlled by the processor 36 to satisfy operating requirements. To lower current the firing angle 52 would be moved to the right in FIG. 4 to decrease conduction time. Conversely, to increase current the firing angle 52 would be moved to the left to increase conduction time, as is well known. During start mode, the processor 36 ramps the current up by gradually advancing the firing angle 52 in a time specified to satisfy preselect acceleration time and acceleration torque values up to a select starting current limit setting value. By adjusting the delay in firing the SCRs 32, the processor 36 can maintain this level. As the motor speed increases, the current begins to decrease. The processor 36 continually increases the voltage to offset the reduction in current. This maintains a constant current at the setting of the starting current limit switch provides that the voltage to the motor can be increased at a rate greater than the decrease in the motor slip resistance as the motor comes up to speed. Subsequently during a run mode the control circuit 34 applies full voltage to the motor.

In accordance with the invention, the control circuit 34 utilizes a motor start current limit control module 54, see FIG. 2, to provide automatic current limit control during the start mode. Starting current limit is adjustable either in amps from 115% to 425% on a standard unit, or on a percentage of the overload setting from 150% to 450% using the user actuable switches 46 or a keypad of an external configuration device. The automatic current limit control module 54 ramps the currents from either the 115% or the 150% setting to either the 425% or 450% on each start over a period of, for example, 250 milliseconds. During the ramp the processor 36 monitors the magnitude of the incoming line voltages using the voltage sense circuits 40. If the line voltage magnitude drops below a select threshold, then the processor 36 holds the current limit setting constant at its present ramp value. As an example, the threshold could be based on 95% of an average of the incoming power gathered over the previous two minutes. If the sensed voltage continues to drop, then the processor 36 reduces the current limit setting until the voltage no longer drops or a minimum setting of twice the overload is reached. If after holding or reducing the current limit setting the voltage starts to rise, then the ramp is again increased towards either the 425% or 450% setting at a quarter of the previous ramp rate. If the voltage drops again, then the processor 36 holds or reduces the current limit setting based on how the incoming voltage reacts.

Referring to FIG. 5, a flow diagram illustrates the program for the motor start current limit control module 52. This module is initiated each time starting operation is commanded by the processor 36. The module begins at a node 60 which begins the current ramp, as discussed above. A decision block 62 determines if a voltage dip is sensed. The drop in line voltage can be greater than a predetermined percentage, such as 95% discussed above, or an adjustable percentage. This can be based upon the configuration of the system. If there is no voltage dip, then controller returns to the block 60 to continue the ramp. If a voltage dip is sensed, then control proceeds to a block 64 which holds the current limit constant at the point where the voltage started to dip. Thereafter, a decision block 66 determines if the voltage level recovers. If so, control proceeds to a block 68 which decreases the rate of increase and then back to the block 60. As a result, the current ramp resumes to the maximum setting, albeit at a decreased rate. As is apparent, the block 68 could be eliminated or configured to maintain the original ramp rate.

Returning to the decision block 66, if the voltage has not recovered then a decision block 70 determines if the voltage continues to dip with the current limit setting held constant at the point where the first dip was detected. If so, then the processor 36 decreases the current limit setting at a block 72 and returns to the block 64. As a result, the processor 36 decreases the current limit setting either until the voltage recovers to a level above the point where the first dip was detected or optionally until the current limit is decreased to 200% of the overload setting.

Using the current limit control module 54 the load is brought up to speed in the minimal time allowed based upon the condition of existing power. By utilizing such a start mode, the motor controller 20 can compensate for weak lines, emergency generators and peak load conditions by adjusting the current limit to provide the quickest start times under all conditions.

It can therefore be appreciated that a new and novel system and method for automatically controlling current limit in a motor controller has been described. It will be appreciated by those skilled in the art that, given the teaching herein, numerous alternatives and equivalents will be seen to exist which incorporate the disclosed invention. As a result, the invention is not to be limited by the foregoing exemplary embodiments, but only by the following claims.

We claim:

1. A motor controller system comprising:
   solid state switches for connection between an AC line and motor terminals for controlling application of AC power to the motor;
   a sensor for sensing AC line voltage; and
   a control circuit for controlling operation of the solid state switches, the control circuit ramping switch current during a start mode and selectively holding switch current during the start mode if sensed voltage drops below a threshold amount.

2. The motor controller system of claim 1 wherein the control circuit decreases switch current during the start mode if sensed voltage drops below a reduced threshold amount.

3. The motor controller system of claim 1 wherein the control circuit resumes the switch current ramp during the start mode if sensed voltage recovers above the threshold amount.

4. The motor controller system of claim 3 wherein the control circuit resumes the switch current ramp at a decreased rate of increase.

5. The motor controller system of claim 1 further comprising current sensors for sensing switch current.

6. The motor controller system of claim 1 wherein the solid state switches comprise SCRs and firing angle is adjusted to control switch current.

7. A motor starter system comprising:
   solid state switches for connection between an AC line and motor terminals for controlling application of AC power to the motor;
   a voltage sensor for sensing AC line voltage;
   current sensors for sensing switch current; and
   a control circuit operatively connected to the voltage sensor and the current sensors for controlling operation of the solid state switches during a start mode, the control circuit ramping switch current in a preselect range during the start mode and selectively holding switch current during the start mode if sensed voltage drops below a threshold amount.

8. The motor starter system of claim 7 wherein the control circuit decreases switch current during the start mode if sensed voltage drops below a reduced threshold amount.

9. The motor starter system of claim 7 wherein the control circuit resumes the switch current ramp during the start mode if sensed voltage recovers above the threshold amount.

10. The motor starter system of claim 9 wherein the control circuit resumes the switch current ramp at a decreased rate of increase.

11. The motor starter system of claim 7 wherein the solid state switches comprise SCRs and firing angle is adjusted to control switch current.

12. A motor starter system comprising:
   solid state switch means for connection between an AC line and motor terminals for controlling application of AC power to the motor;
   voltage sensing means for sensing AC line voltage;
   current sensing means for sensing switch current; and
   start control means operatively connected to the voltage sensing means and the current sensing means for controlling operation of the solid state switch means during a start mode, the start control means ramping current through the switch means during the start mode and selectively holding switch means current during the start mode if sensed voltage drops below a threshold.

13. The motor starter system of claim 12 wherein the start control means decreases switch means current during the start mode if sensed voltage drops below a reduced threshold amount.

14. The motor starter system of claim 12 wherein the start control means resumes the switch means current ramp during the start mode if sensed voltage recovers above the threshold amount.

15. The motor starter system of claim 14 wherein the start control means resumes the switch means current ramp at a decreased rate of increase.

16. The motor starter system of claim 12 wherein the solid state switch means comprise SCRs and firing angle is adjusted to control current.

17. A method of limiting current during motor starting comprising:
   providing solid state switches for connection between an AC line and motor terminals for controlling application of AC power to the motor;
   sensing AC line voltage;
   sensing switch current;

ramping current through the solid state switches during motor starting; and selectively holding switch current constant during motor starting if sensed voltage drops below a threshold.

18. The method of claim 17 further comprising decreasing switch current during motor start mode if sensed voltage drops below a reduced threshold amount.

19. The method of claim 17 further comprising resuming the switch current ramping during motor start if sensed voltage recovers above the threshold amount.

20. The method of claim 17 wherein resuming the switch current ramping during motor start comprise resuming current ramping at a decreased rate of increase.

21. An elevator starter comprising:

solid state switches for connection between an AC line and motor terminals for controlling application of AC power to the elevator;

a voltage sensor for sensing AC line voltage;

current sensors for sensing switch current; and a control circuit operatively connected to the voltage sensor and the current sensors for controlling operation of the solid state switches during a start mode, the control circuit ramping switch current in a preselect range during the start mode and selectively holding switch current during the start mode if sensed voltage drops below a threshold amount.

* * * * *